US011355077B2

United States Patent
Takada

(10) Patent No.: US 11,355,077 B2
(45) Date of Patent: Jun. 7, 2022

(54) DISPLAY DEVICE THAT REWRITES WITH A FIRST AND SECOND WAVEFORM AND METHOD OF DRIVING THE DISPLAY DEVICE THAT REWRITES WITH A FIRST AND SECOND WAVEFORM

(71) Applicant: TOPPAN PRINTING CO., LTD., Tokyo (JP)

(72) Inventor: Takehisa Takada, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/238,326

(22) Filed: Apr. 23, 2021

(65) Prior Publication Data

US 2021/0319759 A1 Oct. 14, 2021

Related U.S. Application Data

(63) Continuation of application No. PCT/JP2019/040899, filed on Oct. 17, 2019.

(30) Foreign Application Priority Data

Oct. 25, 2018 (JP) .............................. JP2018-200934

(51) Int. Cl.
G09G 3/34 (2006.01)
(52) U.S. Cl.
CPC ....... *G09G 3/344* (2013.01); *G09G 2310/061* (2013.01); *G09G 2320/0204* (2013.01)
(58) Field of Classification Search
None
See application file for complete search history.

(56) References Cited

U.S. PATENT DOCUMENTS

2005/0110743 A1 5/2005 Kawai
2006/0284794 A1* 12/2006 Johnson .................. G09G 3/344
345/58

(Continued)

FOREIGN PATENT DOCUMENTS

JP 2005-148711 A 6/2005
JP 2008-542810 A 11/2008

(Continued)

OTHER PUBLICATIONS

International Search Report dated Jan. 7, 2020 in PCT/JP2019/040899, filed Oct. 17, 2019, (with English Translation).

*Primary Examiner* — Chad M Dicke
(74) *Attorney, Agent, or Firm* — Oblon, McClelland, Maier & Neustadt, L.L.P.

(57) ABSTRACT

A display device including a pair of substrates, a display medium formed between the pair of substrates and including charged particles encapsulated therebetween such that an image is displayed by moving the charged particles electrophoretically, a drive unit that applies a voltage to the display medium, and a display control unit that controls a display of the display medium. After data communication for rewriting a display of a display device commences and before the data communication ends, the display control unit commences rewriting using a first waveform, and after completion of the data communication and after the rewriting using the first waveform, the display control unit executes rewriting using a second waveform.

20 Claims, 6 Drawing Sheets

(56) References Cited

U.S. PATENT DOCUMENTS

2007/0268245 A1* 11/2007 Sugita .................. G09G 3/3446
                                                          345/107
2008/0198184 A1   8/2008 Schellingerhout et al.
2009/0267969 A1* 10/2009 Sakamoto ............ G09G 3/2081
                                                          345/690

FOREIGN PATENT DOCUMENTS

| JP | 2012-003006 A | 1/2012 |
| JP | 2012-032953 A | 2/2012 |
| JP | 2014-002694 A | 1/2014 |
| JP | 2014-186493 A | 10/2014 |
| JP | 2014-191213 A | 10/2014 |
| JP | 5957970 B2 | 7/2016 |

* cited by examiner

DISPLAY DEVICE THAT REWRITES WITH A FIRST AND SECOND WAVEFORM AND METHOD OF DRIVING THE DISPLAY DEVICE THAT REWRITES WITH A FIRST AND SECOND WAVEFORM

CROSS-REFERENCE TO RELATED APPLICATIONS

The present application is a continuation of International Application No. PCT/JP2019/040899, filed Oct. 17, 2019, which is based upon and claims the benefits of priority to Japanese Application No, 2018-200934, filed Oct. 25, 2018. The entire contents of these applications are incorporated herein by reference.

BACKGROUND OF THE INVENTION

Field of the Invention

The present invention relates to a display device and a method of driving the display device.

Discussion of the Background

Liquid crystal displays have been widely used as flat panel displays for various electronic devices and are also used recently for computers or large-scale color displays such as of televisions. Plasma displays are also used as large-scale color displays for televisions. Liquid crystal displays or plasma displays are much thinner than CRT (Cathode-Ray Tube) display devices. Liquid crystal displays or plasma displays are, however, not thin enough to be sufficiently flexible for some usages. If these liquid crystal displays or plasma displays are to be used as displays for mobile devices, power consumption is desired to be reduced even more.

As display devices with even further reduced thickness and power consumption, there have been developed display panels called electronic paper which uses electrophoretic display elements. These electronic paper display panels are being tested for use in electronic books, electronic newspapers, electronic advertising boards, electronic direction signs, and the like. Such a display panel (display device) using electrophoretic display elements is provided with an image display layer which includes a pair of substrates having respective electrodes on opposing surfaces with charged particles being encapsulated therebetween. In the display device, a voltage is applied across electrodes disposed on the pair of substrates to display an image by electrophoretically moving the charged particles according to the polarity of the voltage.

In such an electrophoretic display panel, the charged particles do not move after the voltage applied between the electrodes is removed. This means that the electrophoretic display panel has a memory effect and thus can maintain the display state without consuming electric power. These electrophoretic display panels, which can be driven with very little electrical power, are expected to be used as display devices for applications which require low power consumption. Further, since they are reflective display devices, they do not generate blue light and are easy on the eyes, and are easy to see even in a bright place such as outdoors.

In recent years, RFID (Radio Frequency Identification) has been used in logistics applications for inventory control and product management. Since information stored in the RFIDs can be rewritten or added to by RF (Radio Frequency) wireless communication, RFID is more convenient than printed barcodes or two-dimensional codes that have been widely used. Among RFID devices, an RFID device with a display function has both an RFID function and a display function. Therefore, information stored in the RFID device can be rewritten or added to, to change an image displayed on the display according to the rewritten or appended information. An RFID device with a display function is also referred to as wireless tag. Such an RFID device with a display function is advantageous in that users can visually verify information without use of an RF reader/writer.

Thus, in the case of a conventional RFID device, only a user having the RF reader/writer could read or write information stored in the RFID tag, that is, a user not having the RF reader/writer could not obtain the information stored in the RFID tag. However, in the case of an RFID device with a display function, even a user not having art RF reader/writer can visually verify information stored in the RFID tag by verifying the information on the display.

There has been also proposed a wireless tag with a battery as disclosed in PTL 1. If the wireless tags with batteries are attached to a large number of products or returnable containers (RTI: Returnable Transport Items), it may be difficult to control the state of charge of the battery of each wireless tag. Further, when the battery runs out, wireless communication failure and/or image display failure of the wireless tag may occur.

Therefore, as disclosed in PTL2, a battery-less wireless tag, having no battery, has been considered more suitable. Further, as disclosed in PTL 3, there has been also proposed an IC card with a display function (an embodiment of a wireless tag). PTL 4 discloses a method of driving an electrophoretic display device which achieves both high-speed screen operations such as zoom-in or zoom-out of an image on a display and display of a still image with high quality.

PTL 1: JP 2012-32953 A
PTL 2: JP 2014-186493 A
PTL 3: JP 5957970 B
PTL 4: JP 2012-3006 A

SUMMARY OF THE INVENTION

According to an aspect of the present invention, a display device includes a pair of substrates, a display medium formed between the pair of substrates and including charged particles encapsulated therebetween such that an image is displayed by moving the charged particles electrophoretically a drive unit that applies a voltage to the display medium, and a display control unit that controls a display of the display medium. After data communication for rewriting a display of a display device commences and before the data communication ends, the display control unit commences rewriting using a first waveform, and after completion of the data communication and after the rewriting using the first waveform, the display control unit executes rewriting using a second waveform.

According to another aspect of the present invention, a method of driving a display device includes applying a voltage to a display medium which is formed between a pair of substrates and includes a plurality of charged particles encapsulated therebetween such that an image is displayed by moving the charged particles electrophoretically, and controlling a display of the display medium, wherein the controlling includes executing rewriting of the display of the display device such that after data communication for the rewriting commences and before the data communication ends, the rewriting commences, using a first waveform, and that after completion of the data communication and after the rewriting using the first waveform ends, the rewriting is executed, using a second waveform.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
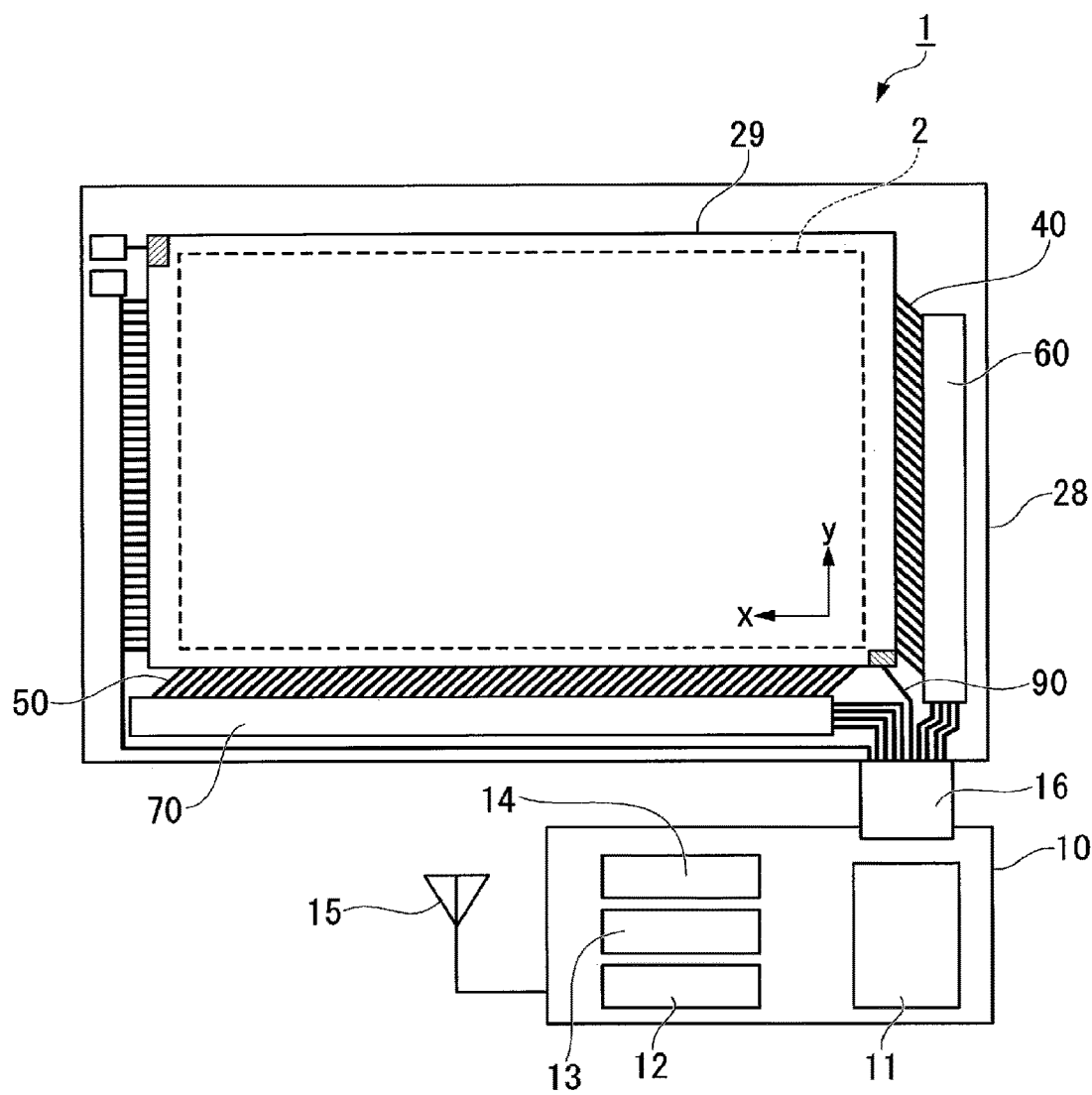
FIG. 1 is a plan view illustrating an example of an electrophoretic display device according to the present embodiment.

The embodiments will now be described with reference to the accompanying drawings, wherein like reference numerals designate corresponding or identical elements throughout the various drawings.

A mode of the embodiments of the present invention for solving the above issues is a display device including: a pair of substrates each having a respective surface on which a respective electrode is provided; a display medium which is disposed between surfaces of the pair of substrates on which the respective electrodes are provided with charged particles being encapsulated therebetween to display an image by moving the charged particles electrophoretically; and a drive unit which applies a voltage to the display medium, characterized in that after data communication for rewriting as display of the display device commences and before the data communication ends, rewriting using a waveform 1 (first waveform) commences in parallel with the data communication, and after completion of the data communication and after the rewriting using the waveform 1, rewriting using a waveform 2 (second waveform) is performed.

Figure 6:
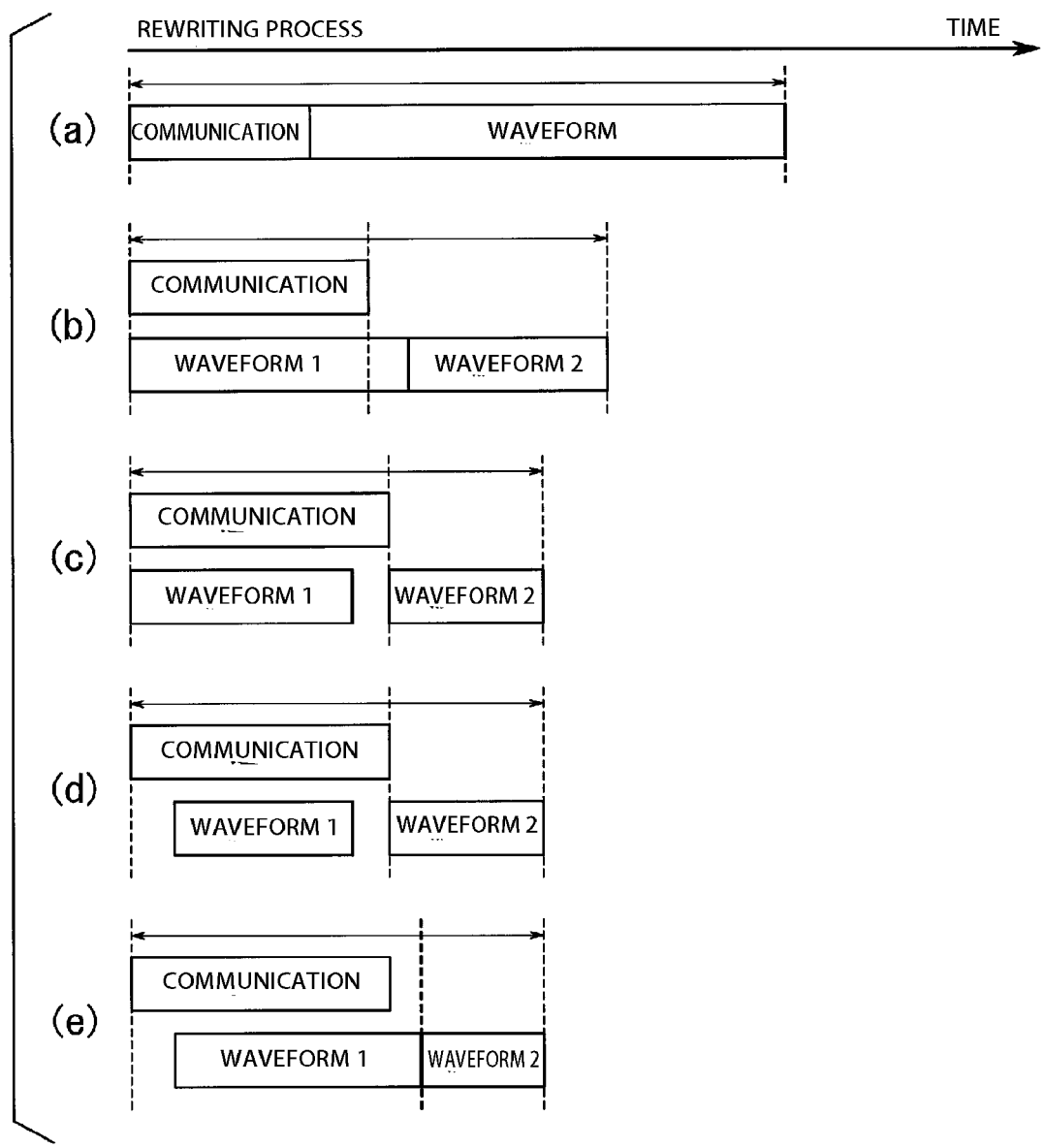
FIG. 6 is a set of diagrams showing a rewriting process of a conventional display device and a rewriting process of an electrophoretic display device according to present embodiment.

FIG. 6 section (a) shows an example of time required for a conventional electrophoretic display device to rewrite an image, and the set of FIG. 6 section (b) to section (e) shows an example of time required for an electrophoretic display device according to an embodiment of the present invention to rewrite an image.

Details of this embodiment are described below.

A varying voltage that is applied to a display medium to rewrite an image on an electronic paper is referred to as a waveform. The waveform information may be always transmitted from the data transmission source or may be stored in advance in the display device, and the present embodiment will be described by way of an example of the latter case. This waveform may be affected by conditions such as external temperature and humidity, or by user's specification, find a plurality of types of waveforms can be prepared in advance.

There is a concept of DC balance in the waveform, and when the sum of the voltages in a certain tune period becomes zero, it is called "maintaining DC balance". Generally, when DC balance is maintained, the life of the electronic paper becomes longer and the contrast becomes higher.

When rewriting an image, a displayed image before being rewritten is referred to as "first image" and a display image after rewriting the first image is referred to as "second image". In rewriting the image, the second image may or may not be based on the first image. Further, the case where the entire display image is rewritten is referred to as "complete rewriting", and the case where a part of the display image is rewritten is referred to as "partial rewriting".

As a result, when the second image is not based an the first image, the DC balance is maintained in the waveform after the display rewriting, and when the second image is based on the first image, the waveform of the first image is typically combined with the waveform after the display rewriting to produce a DC-balanced waveform.

In the case where the second is not based on the first image and is displayed in a black-and-white binary display, two kinds of waveform elements for writing white pixels and writing black pixels are required. When the second mage, is based on the first image, four kinds of waveform elements for writing "white to white" pixels, "black to white" pixels, "white to black" pixels and "black to black" pixels are required. These two or four waveform elements are collectively called waveforms. A specific configuration of a display of the electrophoretic display device of the present embodiment will be described later. Explanation not directly related to the object of the present application will be omitted as appropriate.

In a conventional, wireless tag, data communication is performed first. Since the data communication includes information for the second image, image rewriting using the waveform cannot be commenced unless data communication is completed. FIG. 6 section (a) shows a process of rewriting of a display device by the conventional wireless tag. As shown in FIG. 6 section (a), in the conventional wireless tag, data communication is commenced first, and after this data communication is ended, an image is rewritten using a waveform.

In image rewriting based on the prior art, the first image is typically erased in the earlier part of the waveform, and then, the desired second image is written in the later part of the waveform. For example, in the case of a black-and-white binary display, the first image is erased by being rewritten to produce the inverted image of the second image (image with black and white reversed) in the earlier part of the waveform, and then the second image is written in the later part of the waveform. Thus, the first image is erased and then rewritten to produce the second image in a DC-balanced state.

Examples of the methods of erasing the first image include writing two images alternately and continuously consisting of an image which is entirely white and an image which is entirely black, or writing a random image besides these two images, the random image being written between the two images. These methods may also be used in combination. A method of repeatedly writing two images in a short time is called shaking, and is actively used for erasing the first image, the two images consisting of an image which is entirely white and an image which is entirely black.

In writing of the desired second image which is written in the later part of the wave form, the earlier part of the waveform is configured in conjunction with the later part of the waveform to maintain a DC balance and keep good display characteristics. Therefore, in the prior art, rewriting to produce the second image is not commenced until the second image is available. As described above, in the prior art, the total rewrite time, which is the sum of the communication time and the display rewrite time, may become longer.

In the present embodiment, as shown in FIG. 6 section (b), rewriting using a waveform 1 (first waveform) is commenced immediately after the commencement of data communication. The definition of the waveform 1 and the waveform 2 (second waveform) will be described. The waveform 1 in a first part of the rewriting waveform, the first part not being based on the second image, is mainly for erasing the first image. The waveform 1 in a second part of the rewriting waveform, the second part being based on the second image, is mainly for displaying the second image.

As described above, rewriting using the first waveform is commenced in parallel with data communication, and rewriting using the second waveform is performed after rewriting using the first waveform is completed. In FIG. 6 section (b), data communication and rewriting using the first waveform are commenced substantially simultaneously; however, rewriting using the first waveform may be commenced after data communication commences and before data communication ends.

Since the waveform 1 is not based on the second image, rewriting using the waveform 1 commences immediately after the commencement of the data communication regardless of the second image. In the waveform 1, the first image is erased using a predetermined waveform. For example, two images, consisting of an image which is entirely white and an image which is entirely black, are each written twice. Thus, the process of erasing the first image is progressed in parallel with the data communication.

After rewriting using the waveform 1 is completed, rewriting using the waveform 2 is performed. The waveform 2 is mainly for rewriting to produce the second image. Ideally, this rewriting is performed in a shorter display rewrite time while maintaining the DC balance. However, when the reverse color (black for white, white for black) is written in order to maintain the DC balance in the black-and-white binary display, the display rewrite time increases. Therefore, it is effective that the minimum rewriting required for producing the desired display using the waveform 2 is performed, without considering the DC balance.

If a waveform that does not take DC balance into consideration is adopted, long-term reliability may be degraded, but display rewrite time is shortened. In the case of repetition of displaying two images consisting of an image which is entirely white and an image which is entirely black, the electrophoretic particles can move freely. Therefore, the effect of the charge imbalance due to the DC imbalance (not being DC balanced) can be alleviated.

As shown in FIG. 6 section (c) to 6 section (d), the time of the waveform 1 can be arbitrarily set in accordance with the time required for data communication. FIG. 6 section (c) shows a case where the data communication time is longer than the time of the waveform 1. FIG. 6 section (d) shows a case where the data communication time is longer than the time of the waveform 1 and the beginning of the waveform 1 is delayed. FIG. 6 section (e) shows a case where the beginning of the waveform 1 is delayed and the end of the waveform 1 is later than the end of the data communication time. The duration of the waveform 1 can be arbitrarily set. For example, when the data communication time is assumed to be long, the duration of the waveform 1 can be increased.

Ideally, the beginning of the waveform 1 is immediately after the commencement of the data communication; however, it can be arbitrarily set in accordance with the performance of the communication controller or the display controller. For example, when the operation of the communication controller and the operation of the display controller conflict with each other, the beginning of the waveform 1 can be slightly delayed.

In the electrophoretic display device of the present embodiment, at least rewriting to produce an image which is entirely white or an image which is entirely black may be performed one or more times during rewriting using the waveform 1.

As described above, it is effective to display an image which is entirely white or an image which is entirely black for erasing the first image. Repetition of displaying an image which is entirely white and displaying an image which is entirely black is also effective for erasing the first image. As to whether the entirely white image is displayed first or the entirely black image is first can be arbitrarily selected depending on the situation where the electrophoretic display device is used. Further, the time of voltage application for displaying the entirely white image and the time of voltage application for displaying the entirely black image can be arbitrarily set. Thus, the voltage and time of the waveform 1 can be arbitrarily set in accordance with how much the first image is desired to be erased, how much afterimage is allowed, and the like.

In the electrophoretic display device of the present embodiment, rewriting using waveform 1 may be ended by displaying an entirely white image entirely black image.

To reduce the total rewrite time, an image resulting from rewriting by waveform 1 may be arbitrarily set in accordance with an image finally desired to be displayed on the display.

Figure 7:
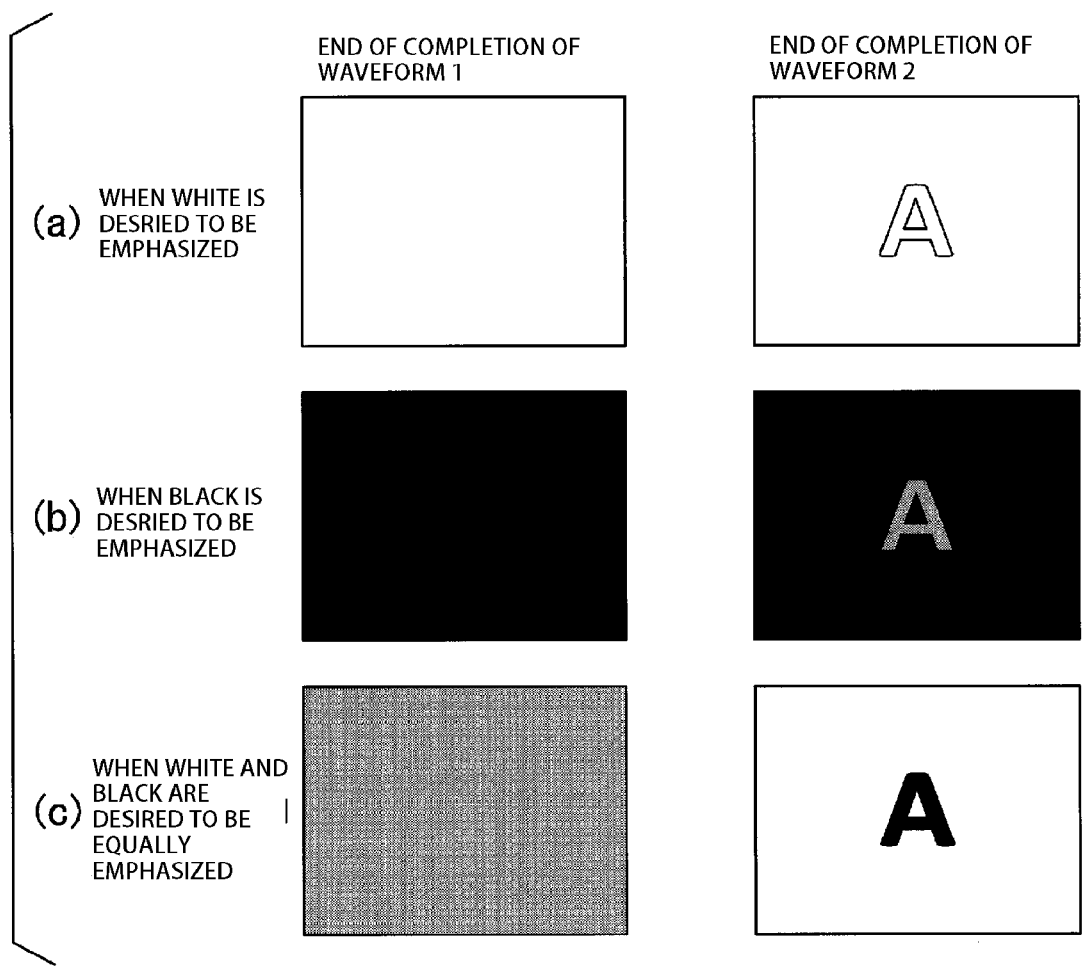
FIG. 7 is a set or diagrams showing an example of a display of an electrophoretic display device according to the present embodiment.

For example, as shown in FIG. 7 section (a) 7 section c), if an image to be finally emphasized is displayed at the end of the waveform 1, the target color can be easily emphasized even when the image is rewritten to the second image in a short time. For example, FIG. 7 section (a) shows the case where white is desired to be emphasized. By displaying an entirely white image after ending the process in waveform 1, it is easy to increase the brightness of white when rewriting using the waveform 2.

Similarly, FIG. 7 section (b) shows the case where black is desired to be emphasized. By displaying an entirely black image after ending the process in waveform 1, it is easy to decrease the brightness of black when rewriting in the waveform 2.

FIG. 7 section (c) shows the case where white and black are desired to be equally emphasized. By displaying an image which is entirely gray, which is a middle color between white and black, after ending the process in waveform 1, it is easy to increase the brightness of white and is easy to decrease the brightness of black when rewriting using the waveform 2.

Using such a method, for example, when there is a request to display the background white with high brightness for outdoor display, the waveform 1 can end with a white display, and white can be emphasized at the end of the waveform 2.

In the electrophoretic display device of the present embodiment, rewriting using the waveform 1 may be ended by displaying an entirely gray image. As described above, when white and black are desired to be emphasized equally, the screen at the end of the waveform 1 can be set to gray (brightness level between white and black).

As the white display, far example, the brightness may be set to 60 or more in L* of the Lab color system, and as the black display, L* may be set to less than 25, and as the gray display, for example, L* may be set to 25 or more and less than 60. A gray display is more preferable when the L* of the entire display surface is uniform because the display of the second image can be easily controlled.

In the electrophoretic display device of the present embodiment, rewriting using the waveform 1 includes rewriting to produce an inverted image of a displayed image, and the DC balance may be maintained by combining the waveform 1 and the waveform 2 for displaying the displayed image. Since the previous rewriting information can be stared in the memory, the stored information can be referred to and written in the waveform 1 from the commencement of data communication until the end of data communication.

In the conventional method, the DC balance is often maintained in 1 waveform, but in this embodiment, the "waveform" can be divided into waveform 1 and waveform 2, and the DC balance can be maintained using both the previous waveform 2 and the current waveform 1. Strictly, the DC balance is slightly lost by the subsequent rewriting in the waveform 2, but the DC balance is again maintained at the end of the waveform 1 of the next writing.

In the electrophoretic display device of the present embodiment, the time taken from the commencement of any one of the data communication, the waveform 1, and the waveform 2 in the display device to the end of all the data communication, the waveform 1, and the waveform 2 may be within 4 seconds. The time taken from the commencement of any one of the above-described processes to the end of all the processes represents the total rewrite time. When the display device is used as a wireless tag, the total rewrite time is preferably short. Since the time taken for data communication or rewriting is a waiting time for the user, it is preferable that the time be shorter, and it is more preferable that the time be 2 seconds or less. Since the maximum transmission time of wireless power in the 920 MH band is 4 seconds, the total rewrite time (that is, the time taken for receiving wireless power output) is preferably 4 seconds or less.

In the present embodiment, the rewriting with the waveform 1 may be commenced after the data communication is commenced. Conventionally, rewriting commences after all data communications are completed. Therefore, if the reader/writer issues a rewrite instruction, the user does not know whether the rewrite instruction or the data communication is being performed until the rewrite is commenced. In this embodiment, since the rewriting in the waveform 1 commences immediately after the rewriting instruction is issued, the user can immediately determine whether the rewriting instruction has been issued.

The electrophoretic display device of the present embodiment may have a power source. Further, the electrophoretic display device of the present embodiment may be a battery-less type display device which does not have a power source but has a wireless power supply unit and can rewrite the display using wireless power supply. In the case of a battery-less display device, the display can be stably rewritten in a short time using wireless power supply.

In the driving method of a display device including; a pair of substrates each having a respective surface on Which a respective electrode is provided; a display medium which is disposed between surfaces of the pair of substrates on which the respective electrodes are provided, with charged particles being encapsulated therebetween to display an image by moving the charged particles electrophoretically; and a drive unit which applies a voltage to the display medium, after data communication for rewriting a display of the display device commences and before the data communication, rewriting using the waveform 1 commences in parallel with the data communication, and after completion of the data communication and the rewriting using the waveform 1, rewriting using the waveform 2 is performed. Thus, the total rewrite time is reduced, the viewer's waiting time required for rewriting is reduced, and high display quality can be maintained.

With reference to the drawings, an electrophoretic display device according to the present embodiment and a driving method therefor will be further described. In the following embodiment, an electrophoretic display device according to the present embodiment will be described by way of an example of an electrophoretic display device based on an active matrix drive system. However, the configuration may be based on a segmented system or the like.

FIG. 1 is a peripheral-plan view illustrating an example of a display unit of an electrophoretic display, device according to the present embodiment. An electrophoretic display device 1 shown in FIG. 1 is an electrophoretic display device based on an active matrix drive system. The display device 1 includes a display unit 2, a controller 10, a scanning line drive circuit (scanning line driver) 60, and a data line drive circuit (data line driver) 70. The controller 10, which is connected to the display unit 2 via a flexible cable 16, includes a display control unit 11 a memory 12, a current/voltage control unit 13, a communication control unit 14, an antenna 15, and the life. The scanning line rive circuit 60 and the data line drive circuit 70 may also be referred to as a drive unit. The drive unit applies a voltage to a display medium 35, which will be described later.

The antenna 15 receives radio waves transmitted from a reader/writer. The communication control unit 14 performs data communication. The current/voltage control part 13 controls voltage/current during data communication or rewriting. The display control unit 11 controls the display of the display medium 35 which will be described later, based on the data received from the antenna. Although each control unit is described separately for convenience, may be appropriately integrated or shared depending on the type of integrated circuit to be mounted.

Figure 2:
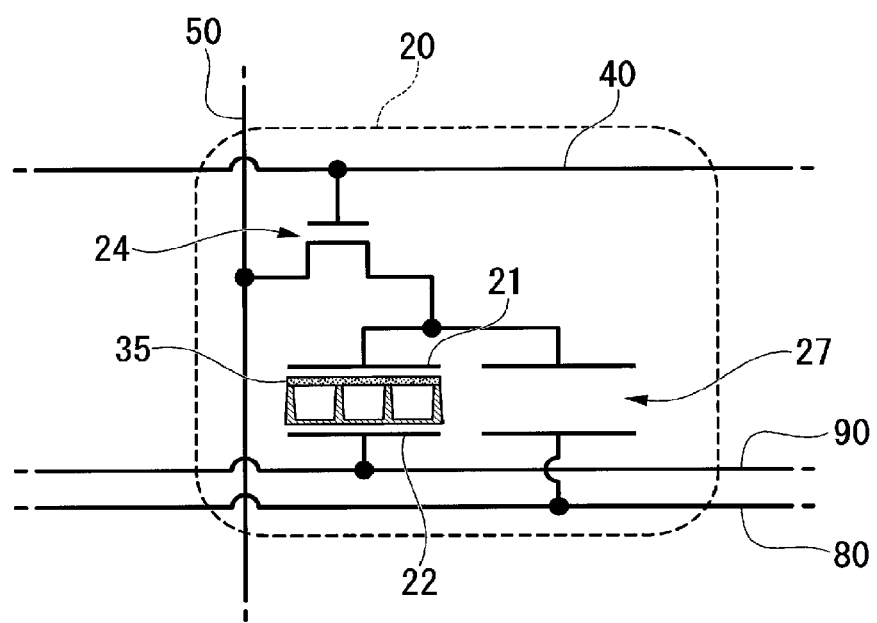
FIG. 2 is an equivalent circuit diagram illustrating an electrical configuration of a pixel according to the present embodiment.

FIG. 2 is an equivalent circuit diagram illustrating an electrical configuration of pixel 20 according to the present embodiment FIG. 2 shows the pixel 20 including a pixel switching transistor 24, a pixel electrode 21, a counter electrode 22, a display medium 35, and a holding capacitor 27. The counter electrode 22 is connected to a common potential line 90, while the holding capacitor 27 is connected to a capacitor potential line 80.

FIG. 2 shoes an example of one pixel 20 in the i-th row and the j-th column among a plurality of pixels 20 arranged on the display unit 2 in an active matrix drive system. Although not illustrated, the display unit 2 is provided with in-rows×n-columns of pixels 20 which are provided in a matrix arrangement (arrayed two-dimensionally), with n scanning lines 40 (Y1, Y2, ..., Yi, ..., Ym) intersecting, with n data lines 50 (X1, X2, . . . , Xj, . . . , Xn). Specifically, the m scanning lines 40 extend in the row direction (i.e., X direction in FIG. 1), and n data lines 50 extend in the column direction (i.e., Y direction in FIG. 1). The pixels 20 are disposed at respective intersections of the m scanning lines 40 and n data lines 50.

The controller 10 controls operations of the scanning line drive circuit 60 and the data line drive circuit 70 using the display control unit 11, the mentor 12, the current/voltage control unit 13, and the like. The controller 10 supplies, for example, a timing signal, such as a clock signal or a start pulse, to individual circuits.

The scanning line drive circuit 60 sequentially supplies pulsed scanning signals to the scanning lines Y1, Y2, . . . , Ym during a predetermined frame period under control of the controller 10.

The data line drive circuit 70 supplies data potentials to the data lines X1, X2, . . . , Xn under control of the controller 10. The data potential may take a reference potential GND (for example, 0V), a high potential V1 (for example, +15V), or a low potential V2 (for example, −15V) or the like.

The controller 10 supplies the common potential Vcom (in the present embodiment, the same potential as the gate feedthrough voltage Vgf) to the common potential line 90.

Since the controller 10 includes the memory 12, a displayed image can be stored before being rewritten. In the present embodiment, the data of the first image is compared with the data of the second image which follows the first image to perform rewriting with an optimum driving waveform.

The pixel switching transistor 24 is configured with, for example, an N-type transistor, but may instead be a P-type. The pixel switching transistor 24 includes a gate electrically connected to the scanning lines 40, a source electrically connected to the data lines 50, and a drain electrically connected to the pixel electrode 21 and the holding capacitor 27. The pixel switching transistor 24 outputs a data potential supplied from the data line drive circuit 70 via the data lines 30, to the pixel electrode 21 and the holding capacitor 27, in response to a pulsed scanning signal being output from the scanning line drive circuit 60 via the scanning lines 40.

The pixel electrode 21 receives a data potential from the data line drive circuit 70 via the data lines 50 and the pixel switching transistor 24. The pixel electrode 21 is disposed so as to face the counter electrode 22 via the display medium 35.

The counter electrode 22 is electrically connected to the common potential line 90 to which the common potential Vcom is supplied.

Figure 5:
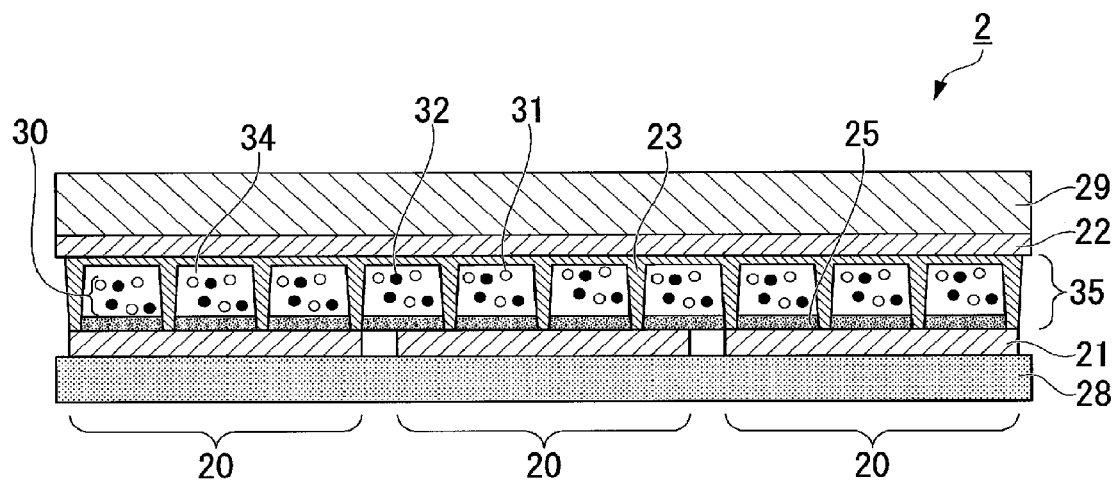
FIG. 5 is a cross-sectional view illustrating an example of display of an electrophoretic display device according to the present embodiment.

For example, as shown in FIG. 5, the display medium 35 includes microcups 23 which are filled with charged particles 30 and a display solvent 34 and sealed with a sealing member 25. The present embodiment shows a microcup-based display device. However, the display device may include a display medium 35 based on other materials, such as microcapsules. The charged particles 30 move only when an electric field is applied, and do not move when no electric field is applied, and maintain the displayed image as it is. In other words, the charged particles 30 have a memory effect for the displayed image.

The holding capacitor 27 has a pair of electrodes facing each other via a dielectric film. One electrode is electrically connected to the pixel electrode 21 and the pixel switching transistor 24, and the other electrode is electrically connected to the capacitor potential line 80 (constant potential). The holding capacitor 27 is capable of maintaining a data potential for a predetermined period.

Figure 3:
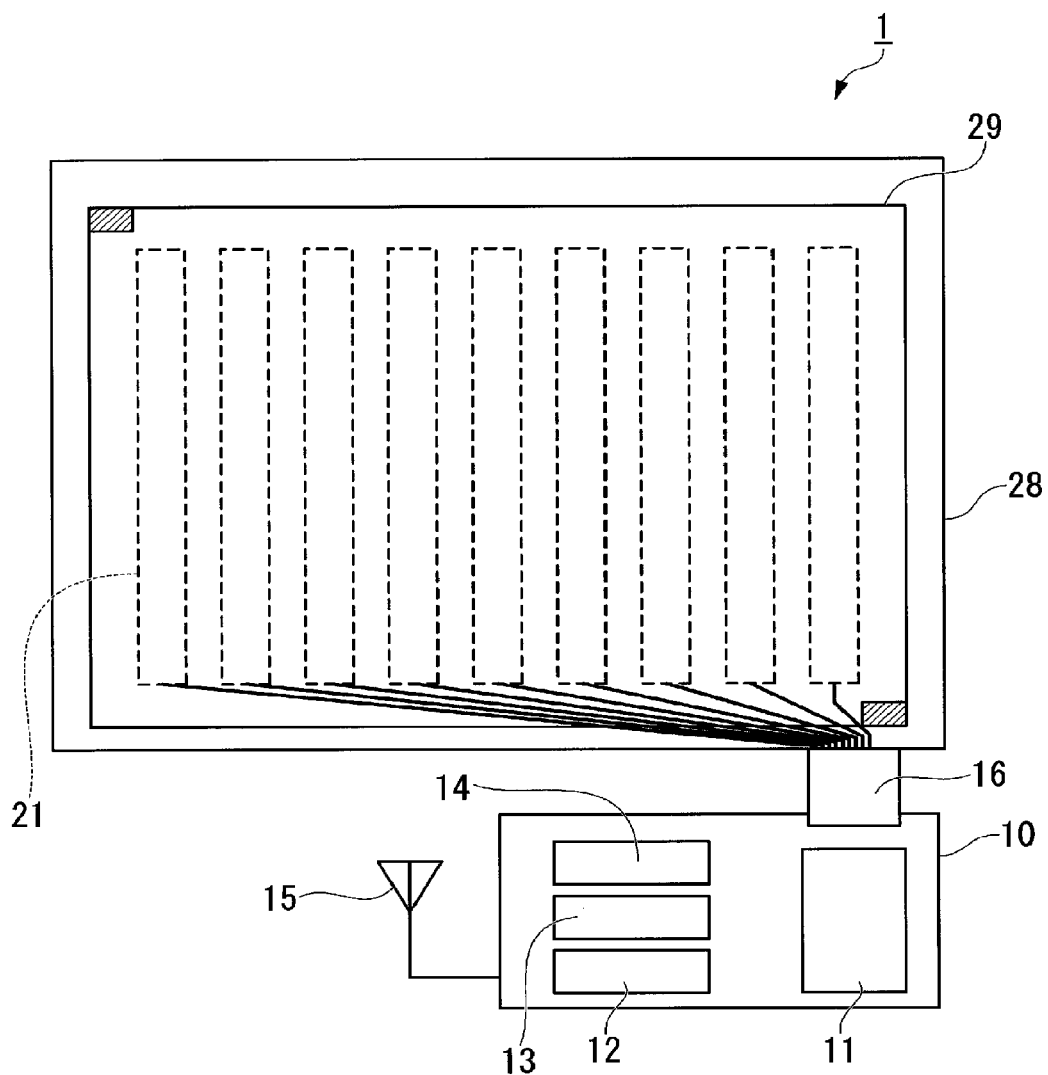
FIG. 3 is a plan view illustrating another example of an electrophoretic display device according to the present embodiment.

FIG. 3 is a plan view illustrating another example of a display unit and its surroundings of an electrophoretic display device according to the present embodiment, and differs from the electrophoretic display device 1 shown in FIG. 1 in that the electrophoretic display apparatus is of a segmented electrophoretic display device. The segmented electrophoretic display device 1 shown in FIG. 3 displays an image using configuration that is the same as that of the pixel electrodes 21.

Figure 4:
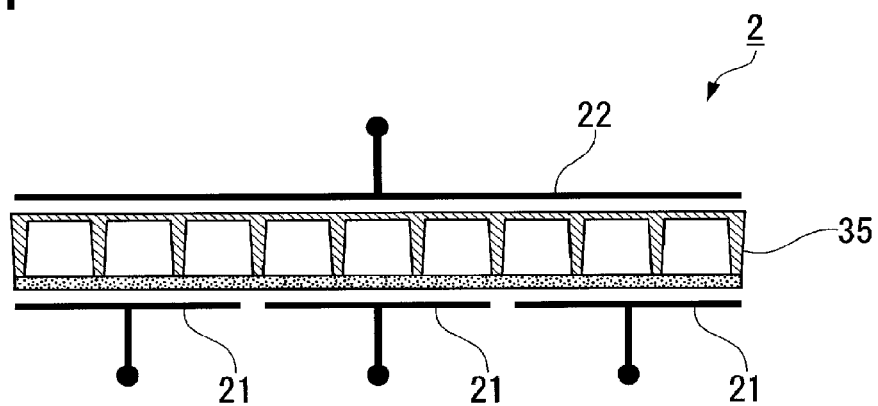
FIG. 4 is a cross-sectional view illustrating an example of a display of an electrophoretic display device according to the present embodiment.

FIG. 4 shows a cross-sectional diagram of a wiring of the display unit 2 of the segmented electrophoretic display device 1. In this manner, the display medium 35 is sandwiched between the counter electrode 22 and each pixel electrode 21. When a rewriting voltage is applied to the segmented pixel electrodes 22, the display color changes.

With reference to FIGS. 1 and 2, a description will be given of a method of driving the electrophoretic display device 1 according to the present embodiment. In this case, a high voltage VGH or a low voltage VGL is applied to the scanning lines 40 (gate wires) by the scanning line drive circuit 60. In the case of n-channel thin film transistors (TFTs), VGL is a non-selective potential, while YGH is a selective potential. In the case of p-channel TFTs, VGH is a non-selective potential, while VGL is a selective potential. For example, VGH=+20 V, and VGL=−20 V.

At the same time, as a data potential the first voltage V1, the second voltage V2 or 0 V is applied to the data lines 50 (source wires) by the data line drive circuit 70. For example, V1=+15 V, and V2=−15 V. With a selected row oil TFTs being turned on, the applied data potential is written into the pixel electrodes 21. By sequentially changing the selected row and the data potential, data potentials are written to the pixel electrodes 21 across the entire image area. This is called line-sequential driving.

It should be noted that each written potential varies by an amount corresponding to a gate-feedthrough voltage Vgf when the scanning line 40 (gate wire) has a non-selective potential and the TFT is turned off. Specifically, the pixels to which the first voltage V1, the second voltage V2, the third voltage or 0 V has been written have a voltage of V1+Vgf, V2+Vgf or Vgf. Vgf is given by the formula 1 shown below: Vgf, which is given based on Formula 1, is negative in the case of n-channel TFTs, and positive in the case of p-channel TFTs.

$$Vgf=\Delta Vg \cdot Cgd/(Cs+Cp+Cgd) \quad \text{(Formula 1)}$$

In the formula, ΔVg is a voltage variation of the scanning line 40 (gate wire) when the state of the TFT changes from on to off and thus is (VGL-VGH) in the case of n-channel TFTs and (VGH-VGL) in the case of p-channel TFTs. Cgd is a gate-drain capacitance, Cs is a storage capacitance connected to the pixel electrode, and Cp is a capacitive component of the display medium. By adjusting the potential of the counter electrode 22 to a predetermined value (gate-feedthrough voltage Vgf), the voltage across the pixel electrodes 21 and the counter electrode 22 can be the first voltage V1, the second voltage V2 or 0 V.

Thus, use of the thin film transistor array enables dot matrix display. When the individual pixels of the dot matrix 20 are enabled display using a combination of a plurality of sub-steps of applying the first Voltage V1, the second voltage V2 or 0 V, the respective pixels 20 can produce the desired display image.

With reference now to FIG. 5, a specific configuration of a display of the electrophoretic display device of the present embodiment will be described.

FIG. 3 is a partial cross-sectional view illustrating the display 2 of the electrophoretic display device 1 according to the present embodiment. As shown in FIG. 5, each pixel 20 is configured to sandwich the display medium 35 between a substrate 28 and a counter substrate 29.

The substrate 28 may be made, fix example, of glass, plastic, or the like, Although not shown, the substrate 28 is provided thereon with a laminate structure incorporating the pixel switching transistors 24, the holding capacitors 27, the scanning lines 40, the data lines 50, the common potential line 90, and the like which have been described above. This laminated structure may be, for example, the structure shown in FIG. 2. The laminate structure has an upper layer which is provided with a plurality of pixel electrodes 21 in a matrix arrangement.

For example, the counter substrate 29 is a transparent substrate made of glass, plastic, or the like. The counter substrate 29 has a surface facing the substrate 28, which is provided with a counter electrode 22 that is formed closely (planarly) facing the plurality of pixel electrodes 21. The counter electrodes 22 are made of an electrically conductive transparent material, such as indium tin oxide (ITO) or indium zinc oxide (IZO).

The display medium 35 is disposed between surfaces of the pair of substrates 28 and 29, the surfaces having electrodes 21 and 22, respectively. The display medium 35 is obtained by dispersing the charged particles 30 in the display solvent 34 which is filled in the microcups 23, and sealing the microcups 23 the sealing member 25. The charged particles 30 contain the white particles 31 which are the first particles, and the black particles 32 which are the second particles. The microcups 23 may be made of, for example, plastic, such as a thermosetting resin or a UV curable resin, or other materials. The sealing member 25 may be made of, for example, plastic, such as a thermosetting resin or a UV curable resin, or other materials.

The display solvent 34 may be water, an alcohol-based solvent such as methanol, ethanol, isopropanol, butanol, octanol or methyl cellosolve, esters such as ethyl acetate and butyl acetate, ketones such as acetone, methyl ethyl ketone and methyl isobutyl ketone, an aliphatic hydrocarbon such as pentane, hexane or octane, an alicyclic hydrocarbon such as cyclohexane or methylcyclohexane, an aromatic hydrocarbon such as benzene, toluene or benzenes having a long chain alkyl group such as xylene, hexylbenzene, butylbenzene, octyl benzene, nonyl benzene, decyl benzene, undecyl benzene, dodecyl benzene, tridecyl benzene and tetradecyl benzene, halogenated hydrocarbons such as methylene chloride, chloroform, tetrachloromethane or 1,2-dichloroethane, carboxylates or other oils. These materials may be used singly or as a mixture of two or more. The solvent for dispersion may contain a detergent.

Examples of white particles 31 may include particles (polymers or colloids) comprising white pigments such as titanium dioxide, flowers of zinc (zinc oxide), antimony trioxide, aluminum oxide, zirconium oxide, barium sulfate, and lead sulfate.

Examples of black particles 32 may include particles (polymers or colloids) comprising black pigments such as manganese ferrite black spinel, copper chromite black spinel, aniline black, and carbon black.

These pigments may additionally contain, as necessary, a charge control agent comprising particles such as of electrolyte, detergent, metal soap, resin, rubber, oil, varnish or compound, a dispersant such as titanium-based coupling agent, aluminum based coupling agent or silane-based coupling agent, a lubricant, a stabilizer, or the like.

EXAMPLES

The present invention will be described by means of examples. However, the present invention is not limited to those examples. In the following examples and comparative examples, an electrophoretic display device 1 based on an active matrix drive system shown in FIG. 1 was used.

Example 1

In Example 1, the data communication time of the display device 1 was set to 2000 ms, and rewriting was performed in waveform 1 after commencement of data communication. In waveform 1, voltages of +15 V, −15 V, +15 V, and −15 V were written for 500 ms each. The rewriting using the waveform 1 ended with displaying a white image. After the data communication and the waveform 1 were completed, rewriting using the waveform 2 was performed for 500 ms. At this time, if white was to be displayed, a voltage of −15 V Was applied to the pixel side, and if black was to be displayed, a voltage of +15 V was applied to the pixel side. The detailed conditions are shown in Table 1. In this embodiment, since the first image is erased in parallel with the data communication, the total rewrite time was 2500 ms. In this case, toe brightness L* of the portion in which white is displayed was 71 and the brightness L* of the portion in which black is displayed was 18.

Example 2

In Example 2, the form of the waveform 1 and the waveform 2 were changed from of Example 1. In the waveform 1, voltages of −15 V, +15 V, −15 V, and +15 V were written for 500 ms each, and rewriting ended with displaying a black image. Subsequently, in waveform 2, if white was to be displayed, a voltage of −15 V was written for 600 ms, and if black was to be displayed, a voltage of +15 V was written for 600 ms. The total rewrite time was 2600 ms. In this case, the brightness of the portion in which white was displayed was 72 and the brightness L* of the portion in which black was displayed was 16.

Example 3

In Example 3, the form of the waveform 1 and the waveform 2 was changed from that of Example 1. In the waveform 1, rewriting was performed by writing a voltage of +15 V for 400 ms followed by writing voltages −15 V, +15 V and −15 V for 500 ms each. Then rewriting ended with writing of a voltage of +15 V for 100 ms to display a gray image. Subsequently, in waveform 2, if white was to be displayed, rewriting was performed by writing of a voltage of −15 V for 300 ms, followed by writing of a voltage of 0 V for 100 ms, and ended with writing of a voltage of −15 V for 300 ms. Alternatively, if black was to be displayed, rewriting was performed by writing a voltage of +15 V for 300 ms, followed by writing a voltage 0 V for 100 ms, and ended with writing a voltage of +15 V for 300 ms. Providing a resting time (time in which a voltage of 0 V is applied) between each writing, particles which electrophoretically move are aligned with each other, and therefore the brightness difference between white and black increases. The total rewrite time was 2700 ms. At this time, the brightness L* of the portion in which white was displayed was 73 and the brightness L* of the portion in which black was displayed was 15.

Example 4

In Example 4, the form of the waveform 1 and the waveform 2 was changed from that of Example 1. In Example 4, it was considered that rewriting would be performed based on the previous image (first image), and the DC balance be maintained using both the waveform 2 for displaying the previous image (first image) based on and the waveform 1 for displaying the next image (second image) of the previous image. Since the next image is based on the previous image, there are four types of waveform elements.

Table 1 shows the case where the previous image was a white or black image, and the next image was the other of the white or black image. If the previous image was a white image, in the waveform 1, writing a voltage of +15 V for 800 ms, writing of a voltage of −15 V for 500 ms, writing a voltage of +15 V for 500 ms and writing a voltage of −15 V for 500 ms was performed in this order. If the previous image was a black image, the process in the waveform 1 was performed by writing voltages each having opposite signs to that of the voltages written in the case where the previous image was a white image. Specifically, writing a voltage of −15 V for 800 ms, writing of a voltage of +15 V for 500 ms, writing a voltage of −15 V for 500 ms and writing voltage of +15 V for 500 ms were performed in this order. In the waveform 2, writing a voltage for 300 ms was performed so that the DC balance is maintained.

In the waveform 2, a voltage of −15 V was written for 300 ms to provide a white image, or a voltage of +15 V was written for 300 ms to provide a black image. Thus, since the two types of waveforms 2 are each based on the two types of waveforms 1, there are four types of waveform elements in total. The total rewrite time was 2600 ms. At this time, the brightness $L^*$ of the portion in which white was displayed was 71 and the brightness $L^*$ of the portion in which black was displayed was 19.

Comparative Example 1

Unlike the embodiments, rewriting in the waveform 1 and waveform 2 was performed after completion of data communication. The obtained data communication time and display rewrite time were the same as those of Example 1, which were 2000 ms and 2500 ms, respectively. However, the obtained total rewrite time was 4500 ms which was 2000 ms longer than that of Example 1. As for the obtained display quality, the brightness $L^*$ of the portion in which white was displayed was 71 and the brightness $L^*$ of the portion in which black was displayed was 18, which were at the same level as in Example 1.

In Table 1, as a criteria for evaluating rewrite time, a rewrite time equal to or less than an upper limit of continuous wireless power supply in the 920 MHz band, the upper limit being 4 seconds (4000 ms) or less, is defined as good. Further, a rewrite time longer than the upper limit is defined as poor. As a criterion of a display quality, the case where the brightness difference $\Delta L^*$ between black and white, which is the difference between the white brightness and the black brightness, is 50 or more is defined as good, and the case where the brightness difference is less than 50 is defined as Poor. If the value of the brightness difference $\Delta L^*$ between black and white is equal to or more than 40, a difference between white and black can be sufficiently recognized. However, in this case, in order to meet the demand for clearer display, only a value of the brightness difference $\Delta L^*$ between black and white of 50, which is a more stringent criterion, is defined as OK.

TABLE 1

| | Items | | 1 | 2 | 3 | 4 | 5 | 6 | 7 | 8 | 9 | Communication time ms | Overall display rewrite time ms | Total time ms | Evaluation of rewrite time | Display quality Brightness L* of white | Brightness L* of black | Brightness difference ΔL* between white and black | Evaluation of display quality |
|---|---|---|---|---|---|---|---|---|---|---|---|---|---|---|---|---|---|---|---|
| Example 1 | Communication | Time ms | | | 2,000 | | — | | | | | 2,000 | 2500 | 2500 | Good | 71 | 18 | 53 | Good |
| | Display rewriting | Rewriting to white image | Time ms | 15 | -15 | 15 | -15 | -15 | | | | | | | | | | | |
| | | | Voltage V | 500 | 500 | 500 | 500 | 500 | | | | | | | | | | | |
| | | Rewriting to black image | Time ms | 15 | -15 | 15 | -15 | 15 | | | | | | | | | | | |
| | | | Voltage V | 500 | 500 | 500 | 500 | 500 | | | | | | | | | | | |
| | Status | | | Communication + waveform 1 2,000 | | | Waveform 2 | | | | | | | | | | | | |
| Example 2 | Communication | Time ms | | | 2,000 | | — | | | | | 2,000 | 2600 | 2600 | Good | 72 | 16 | 56 | Good |
| | Display rewriting | Rewriting to white image | Time ms | -15 | 15 | -15 | 15 | -15 | | | | | | | | | | | |
| | | | Voltage V | 500 | 500 | 500 | 500 | 600 | | | | | | | | | | | |
| | | Rewriting to black image | Time ms | -15 | -15 | -15 | 15 | 15 | | | | | | | | | | | |
| | | | Voltage V | 500 | 500 | 500 | 500 | 600 | | | | | | | | | | | |
| | Status | | | Communication + waveform 1 2,000 | | | Waveform 2 | | | | | | | | | | | | |
| Example 3 | Communication | Time ms | | | 2,000 | | 15 | -15 | 0 | -15 | | 2,000 | 2700 | 2700 | Good | 73 | 15 | 58 | Good |
| | Display rewriting | Rewriting to white image | Time ms | 15 | 15 | 15 | -15 | 100 | 300 | 100 | 300 | | | | | | | | |
| | | | Voltage V | 400 | 500 | 500 | 500 | 15 | 15 | 0 | 15 | | | | | | | | | |
| | | Rewriting to black image | Time ms | 15 | -15 | 15 | -15 | 15 | | | | | | | | | | | | |
| | | | Voltage V | 500 | 500 | 500 | 500 | | | | | | | | | | | | | |

TABLE 1-continued

| | Items | | 1 | 2 | 3 | 4 | 5 | 6 | 7 | 8 | 9 | Communication time ms | Overall display rewrite time ms | Total time ms | Evaluation of rewrite time | Brightness L* of white | Brightness L* of black | Brightness difference ΔL* between white and black | Evaluation of display quality |
|---|---|---|---|---|---|---|---|---|---|---|---|---|---|---|---|---|---|---|---|
| | | image Time ms | 400 | 500 | 500 | 500 | 100 | 300 | 100 | 300 | | | | | | | | | |
| Example 4 | Communication | Status | | Communication + waveform 1 2,000 | | | | Waveform 2 | | | | 2,000 | 2600 | 2600 | Good | 71 | 19 | 52 | Good |
| | Display rewriting | Previous image is white Voltage V | 15 | −15 | −15 | 15 | −15 | — | — | −15 | — | | | | | | | | |
| | | Time ms | 800 | 500 | 500 | 500 | | Subsequent image is white -> | | 300 | | | | | | | | | |
| | | Previous image is black Voltage V | −15 | 15 | −15 | 15 | | Subsequent image is black -> | | 15 | | | | | | | | | |
| | | Time ms | 800 | 500 | 500 | 500 | | | | 300 | | | | | | | | | |
| Comparative Example 1 | Communication | Status | | Communication + waveform 1 2,000 | | | | | | Waveform 2 | | 2,000 | 2500 | 4500 | Poor | 71 | 18 | 53 | Good |
| | Display rewriting | Rewriting to white image Voltage V | 15 | −15 | 15 | 0 | −15 | — | — | — | −15 | | | | | | | | |
| | | Time ms | 500 | 500 | 500 | 500 | 500 | — | — | — | 15 | | | | | | | | |
| | | Rewriting to black image Voltage V | −15 | 15 | −15 | — | 0 | −15 | 15 | 0 | −15 | | | | | | | | |
| | | Time ms | 500 | 500 | 500 | — | 500 | 500 | 500 | 500 | 500 | | | | | | | | |
| | | Status | | Communication | | | | Waveform 2 | | | | | | | | | | | |

Evaluation Results

In Examples 1 to 4, all rewrite limes were evaluated as good for any type of rewriting, and all display qualities were also evaluated as good. However, in Comparative Example 1, although the display quality was evaluated as good, the rewrite time was evaluated as poor. Thus, in Examples 1 to 4, while maintaining high display quality, the total rewrite time was reduced.

The present application addresses the following, Examples of combinations of an RFID device and a display function include a combination of an RFID device and a rewritable card on which a leuco dye is applied (a leuco rewritable card), and a combination of an RFID device and electronic paper.

The combination of the RFID device and the leuco rewritable card typically has the following advantages. (1) The card is thin (1 mm or less) and (2) is easy to handle.

However, the combination also has the following disadvantages. (3) a dedicated printing apparatus is required, (4) it takes 4 few seconds to tens of seconds to erase or rewrite data, (5) it is only rewritable a small number of times (only a few thousand times), and (6) cleaning is necessary before rewriting.

The combination of the RFID device and electronic paper Chas the following advantages. (1) Data updating and data rewriting can be performed simultaneously, and (2) it can be rewritten a large number of times (hundreds of thousands of times).

However, the combination also has the following disadvantages, (3) It is thicker than a card or a paper medium, (4) it takes a few seconds to rewrite data, and (5) data is rewritten using RF power, therefore, it is currently commercialized only at small size (for example, the size of the display screen is only 2 inches). Regarding the time required for rewriting contents, the combination of the RFID device and electronic paper requires less time than the combination of the RFID device and the leuco rewritable card which requires a dedicated printing apparatus to rewrite data. However, it may still take a few seconds to rewrite the contents displayed on the electronic paper. Since ordinary users are used to seeing liquid crystal display devices that change their contents instantly (1 second or less), they may feel discomfort.

In the case of a battery-less wireless tag, the tag has no power supply; therefore, data communication is performed via RF, and information to be displayed on the electronic paper is rewritten by RF power. In a conventional battery-less wireless tag, the contents to be displayed on the electronic paper are rewritten after ending data communication. The time required for the data communication is defined as "communication time", the time required for rewriting an image on the electronic paper is defined as "display rewrite time", and the total of the communication time and the display rewrite time is defined as "total rewrite time".

In a conventional battery-less wireless tag, power needs to be continuously supplied to the tag from an RF reader/writer during display rewriting even after ending data communication, to rewrite an image to be displayed on the electronic paper. If the display rewrite time is long, there is a problem that the waiting time of users is increased.

If the total rewrite time increases due to wireless communication instability or some disturbance in the process of rewriting via wireless communication, communication becomes unstable and the risk of interruption of the communication is increased. It is important that the total rewrite time is short to achieve stable communication and rewriting.

However, PTLs 1 to 3 do not disclose reduction of the total rewrite time. PTL 4 discloses a technique related to commencing image rewriting by interrupting a previous command when a command for rewriting is continuously issued, and there is no description of reduction of the total rewrite time.

The present invention has an aspect of providing a low-power-consumption electrophoretic display device and a method of driving the electrophoretic display device which reduces the total rewrite time to reduce user's waiting time required when rewriting an image to be displayed on a display, and which maintains high display quality.

To solve the issues set forth above, a display device according to the first aspect of the present invention includes: a pair of substrates each having a respective surface on which a respective electrode is provided; a display medium which is disposed between surfaces of the pair of substrates on which the respective electrodes are provided with charged particles being encapsulated therebetween to display an image by moving the charged particles electrophoretically; a drive unit which applies a voltage to the display medium; and a display control unit which controls a display of the display medium. In the display device, after data communication for rewriting a display of the display device commences and before the data communication ends, the display control unit commences rewriting using a first waveform in parallel with the data communication, and after completion of the data communication and after the rewriting using the first waveform, the display control unit performs rewriting using a second waveform.

In the display device, the display control performs rewriting a displayed image to produce at least an image which is entirely white or an image which is entirely black one times during rewriting using the first waveform.

In the display device, the display control with ends rewriting using the first waveform by displaying an image which is entirely white or an image which is entirely black.

In the display device, the display control unit ends rewriting using the first waveform by displaying an image which is entirely gray.

In the display device, rewriting using the first waveform includes rewriting to produce an inverted image of a displayed image, and the DC balance is maintained by combining the first waveform and the second waveform for displaying the displayed image.

In the display device, the time taken from a commencement of any one of the data communication, the first waveform, and the second waveform in the display device to an end of all the data communication, the first waveform, and the second waveform is 4 seconds or less.

The display device may further lude a wireless power supply unit and may be a battery-less type display device which rewrites a display using wireless power supply.

A driving method of a display device according to the second aspect of the present invention includes: a pair of substrates each having a respective surface on which a respective electrode is provided; a display medium which is disposed between surfaces of the pair of substrates on which the respective electrodes are provided with charged articles being encapsulated therebetween to display an image by moving the charged particles electrophoretically; and a drive unit which applies a voltage to the display medium. In the driving method of the display device, after data communication for rewriting a display of the display device commences and before the data communication ends, rewriting using a first waveform commences in parallel with the data communication, and after completion of the data communication and after the rewriting using the first waveform, rewriting using a second waveform is performed.

According to the embodiments of the present invention, in a low-power-consumption electrophoretic display device and a method of driving the electrophoretic display device which enables display of white and black, reduction of the total rewrite time, thereby reducing a user's waiting time during rewriting an image, and maintaining of high display quality, are achieved.

INDUSTRIAL APPLICABILITY

The embodiments of the present invention are useful as an electrophoretic display device for instructing rewriting in data communication, and is especially useful for a display device with an RFID and a logistics tag mounted on an RT1.

REFERENCE SIGNS LIST

1 . . . Electrophoretic display device
2 . . . Display unit
10 . . . Controller
11 . . . Display control unit
12 . . . Memory
13 . . . Current/voltage control unit
14 . . . Communication control unit
15 . . . Antenna
16 . . . Flexible cable
20 . . . Pixel
21 . . . Pixel electrode
22 . . . Counter electrode
23 . . . Microcup
24 . . . Pixel switching transistor
25 . . . Sealing member
27 . . . Holding capacitor
28 . . . Substrate
29 . . . Counter substrate
30 . . . Charted particles
31 . . . White particles
32 . . . Black particles
34 . . . Display solvent
35 . . . Display medium
13 . . . Scanning line
50 . . . Data line
60 . . . Scanning line drive circuit
70 . . . Data line drive circuit
80 . . . Capacitor potential Elle
90 . . . Common potential line Obviously, numerous modifications and variations of the present invention are possible in light of the above teachings. It is therefore to be understood that within the scope of the appended claims, the invention may be practiced otherwise than as specifically described herein.

What is claimed is:

1. A display device, comprising:
a pair of substrates;
a display medium formed between the pair of substrates and including a plurality of charged particles encapsulated therebetween such that an image is displayed by moving the charged particles electrophoretically;
a drive unit configured to apply a voltage to the display medium; and
a display control unit configured to control a display of the display medium,
wherein the display control unit is configured such that after data communication for rewriting the display of the display medium commences and before the data communication ends, the display control unit commences rewriting using a first waveform, and that after completion of the data communication and after the rewriting using the first waveform, the display control unit executes rewriting using a second waveform.

2. The display device according to claim 1, wherein the display control unit is configured to perform rewriting to produce at least an image which is entirely white or an image which is entirely black one or more times during rewriting using the first waveform.

3. The display device according to claim 1, wherein the display control unit is configured to end rewriting using the first waveform by displaying an image which is entirely white or an image which is entirely black.

4. The display device according to claim 1, wherein the display control unit is configured to end rewriting using the first waveform by displaying an image which is entirely gray.

5. The display device according to claim 1, wherein rewriting using the first waveform includes rewriting to produce an inverted image of a displayed image, and a DC balance is maintained by combining the first waveform and the second waveform for displaying the displayed image.

6. The display device according to claim 1, wherein time taken from a commencement of any one of the data communication, the first waveform, and the second waveform in the display device to an end of all the data communication, the first waveform, and the second waveform, is 4 seconds or less.

7. The display device according to claim 1, further comprising:
a wireless power supply unit,
wherein the display device is a battery-less type display device which rewrites the display medium using wireless power supply.

8. A method of driving a display device, comprising:
applying a voltage to a display medium which is formed between a pair of substrates and includes a plurality of charged particles encapsulated therebetween such that an image is displayed by moving the charged particles electrophoretically; and
controlling a display of the display device,
wherein the controlling includes executing rewriting of the display of the display device such that after data communication for the rewriting commences and before the data communication ends, the rewriting commences, using a first waveform, and that after completion of the data communication and after the rewriting using the first waveform ends, the rewriting is executed, using a second waveform.

9. The method according to claim 8, further comprising: performing rewriting to produce at least an image which is entirely white or an image which is entirely black one or more times during rewriting using the first waveform.

10. The method according to claim 8, further comprising: ending rewriting using the first waveform by displaying an image which is entirely white or an image which is entirely black.

11. The method according to claim 8, further comprising: ending rewriting using the first waveform by displaying an image which is entirely gray.

12. The method according to claim 8, wherein the rewriting using the first waveform includes rewriting to produce an inverted image of a displayed image, and maintaining a DC balance by combining the first waveform and the second waveform for displaying the displayed image.

13. The method according to claim 8, wherein time taken from a commencement of an any or one of the data communication, the first waveform, and the second waveform in the display device to an end of all the data communication, the first waveform, and the second waveform, is 4 seconds or less.

14. A display device, comprising:
a pair of substrates;
a display formed between the pair of substrates and including a plurality of charged particles encapsulated therebetween such that an image is displayed by moving the charged particles electrophoretically;
a drive circuit configured to apply a voltage to the display; and
display control circuitry configured to
control the display,
commencing, after data communication for rewriting the display commences and before the data communication ends, rewriting using a first waveform, and
executing, after completion of the data communication and after the rewriting using the first waveform, rewriting using a second waveform.

15. The display device according to claim 14, wherein the display control circuitry is further configured to perform rewriting to produce at least an image which is entirely white or an image which is entirely black one or more times during rewriting using the first waveform.

16. The display device according to claim 14, wherein the display control circuitry is configured to end rewriting using the first waveform by displaying an image which is entirely white or an image which is entirely black.

17. The display device according to claim 14, wherein the display control circuitry is configured to end rewriting using the first waveform by displaying an image which is entirely gray.

18. The display device according to claim 14, wherein rewriting using the first waveform includes rewriting to produce an inverted image of a displayed image, and a DC balance is maintained by combining the first waveform and the second waveform for displaying the displayed image.

19. The display device according to claim 14, wherein time taken from a commencement of any one of the data communication, the first waveform, and the second waveform in the display device to an end of all the data communication, the first waveform, and the second waveform, is 4 seconds or less.

20. The display device according to claim 14, further comprising:
a wireless power supply,
wherein the display device is a battery-less type display device which rewrites the display using the wireless power supply.

* * * * *